(12) United States Patent
Destraves et al.

(10) Patent No.: US 11,548,331 B2
(45) Date of Patent: Jan. 10, 2023

(54) PNEUMATIC TIRE EQUIPPED WITH AN ELECTRONIC MEMBER

(71) Applicant: COMPAGNIE GENERALE DES ETABLISSEMENTS MICHELIN, Clermont-Ferrand (FR)

(72) Inventors: Julien Destraves, Clermont-Ferrand (FR); Annabel Tourenne, Clermont-Ferrand (FR); Sebastien Noel, Clermont-Ferrand (FR); Jean-Mathieu Clergeat, Clermont-Ferrand (FR); Isabelle Aldon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 877 days.

(21) Appl. No.: 16/466,730

(22) PCT Filed: Nov. 30, 2017

(86) PCT No.: PCT/FR2017/053317
§ 371 (c)(1),
(2) Date: Jun. 5, 2019

(87) PCT Pub. No.: WO2018/104619
PCT Pub. Date: Jun. 14, 2018

(65) Prior Publication Data
US 2020/0062050 A1    Feb. 27, 2020

(30) Foreign Application Priority Data
Dec. 5, 2016  (FR) .................................... 1661924

(51) Int. Cl.
*B60C 23/04*    (2006.01)
*B60C 19/00*    (2006.01)
(Continued)

(52) U.S. Cl.
CPC ........ *B60C 23/0452* (2013.01); *B60C 19/002* (2013.01); *B60C 23/0493* (2013.01);
(Continued)

(58) Field of Classification Search
CPC .............. B60C 23/0452; B60C 19/002; B60C 23/0493; G06K 19/07764; G06K 19/07773; H01Q 1/2241
(Continued)

(56) References Cited

U.S. PATENT DOCUMENTS 5,196,845 A    3/1993  Myatt
6,326,925 B1   12/2001 Perkio et al.
(Continued)

FOREIGN PATENT DOCUMENTS

CN    1448284 A    10/2003
CN    1953881 A    4/2007
(Continued)

OTHER PUBLICATIONS

International Search Report dated Feb. 8, 2018, in corresponding PCT/FR2017/053317 (4 pages).

*Primary Examiner* — Eric Blount
(74) *Attorney, Agent, or Firm* — Venable LLP (57) ABSTRACT

A tire casing is equipped with a radiofrequency transponder and includes a crown, two sidewalls and two beads revolving around a reference axis, first threads forming outward segments and return segments that are arranged adjacently, aligned circumferentially, anchored in the two beads with, in each bead, loops in each case linking an outward segment to a return segment and, in each bead, means for anchoring the first threads, comprising second threads oriented circumferentially axially bordering the first threads and forming at least one spiral, the first threads forming at least one circumferential alignment defining the carcass ply that sepa-
(Continued)

rates said tire casing into two zones, inside and outside with respect to this carcass ply. The radiofrequency transponder comprises at least one electronic chip and a radiating radio-communication antenna and is positioned radially externally in relation to the at least one spiral, characterized in that the radiofrequency transponder comprises a primary antenna electrically connected to the electronic chip, in that the primary antenna is electromagnetically coupled to the radiating antenna, and in that the radiating antenna is formed by a single-strand helical spring defining a first longitudinal axis.

12 Claims, 4 Drawing Sheets

(51) Int. Cl.
  *G06K 19/077* (2006.01)
  *H01Q 1/22* (2006.01)
(52) U.S. Cl.
  CPC . *G06K 19/07764* (2013.01); *G06K 19/07773* (2013.01); *H01Q 1/2241* (2013.01)
(58) Field of Classification Search
  USPC .......................................................... 152/539
  See application file for complete search history.

(56) References Cited

U.S. PATENT DOCUMENTS

| | | |
|---|---|---|
| 6,546,982 B1 | 4/2003 | Brown et al. |
| 6,772,505 B1 | 8/2004 | Logan et al. |
| 6,836,253 B2 | 12/2004 | Strache et al. |
| 6,899,153 B1 | 5/2005 | Pollack et al. |
| 6,991,013 B2 | 1/2006 | Poulbot et al. |
| 7,084,750 B2 | 8/2006 | Johanning et al. |
| 7,102,499 B2 | 9/2006 | Myatt |
| 7,391,307 B2 | 6/2008 | Kuwajima |
| 7,453,407 B2 | 11/2008 | Logan et al. |
| 8,319,659 B2 | 11/2012 | Buck et al. |
| 8,593,357 B2 | 11/2013 | Myatt |
| 9,070,069 B2 | 6/2015 | Sinnett |
| 9,114,671 B2 | 8/2015 | Adamson et al. |
| 9,679,174 B2 | 6/2017 | Destraves et al. |
| 9,754,138 B2 | 9/2017 | Destraves et al. |
| 10,339,435 B2 * | 7/2019 | Destraves ................ H04B 1/24 |
| 11,018,406 B2 * | 5/2021 | Destraves .......... B29D 30/0601 |
| 11,152,684 B2 * | 10/2021 | Destraves ............ H01Q 1/2241 |
| 11,264,698 B2 * | 3/2022 | Destraves ................ H04B 1/59 |
| 11,295,193 B2 * | 4/2022 | Destraves ........ G06K 19/07779 |
| 2003/0085619 A1 | 5/2003 | Strache et al. |
| 2003/0217797 A1 | 11/2003 | Poulbot et al. |
| 2004/0252072 A1 | 12/2004 | Adamson et al. |
| 2006/0208863 A1 | 9/2006 | Kuwajima |
| 2007/0103285 A1 * | 5/2007 | Konno ................ B60C 23/0493 340/447 |
| 2007/0227644 A1 | 10/2007 | Fagot-Revurat et al. |
| 2008/0289736 A1 | 11/2008 | Adamson et al. |
| 2009/0058625 A1 | 3/2009 | Suzuki et al. |
| 2010/0122757 A1 | 5/2010 | Lionetti et al. |
| 2010/0123584 A1 | 5/2010 | Lionetti et al. |
| 2010/0176969 A1 | 7/2010 | Buck et al. |
| 2011/0175778 A1 | 7/2011 | Myatt |
| 2012/0291936 A1 | 11/2012 | Lionetti et al. |
| 2013/0153669 A1 | 6/2013 | Sinnett |
| 2015/0217602 A1 | 8/2015 | Salgues et al. |
| 2015/0239301 A1 | 8/2015 | Vallet et al. |
| 2016/0107490 A1 | 4/2016 | Randall et al. |
| 2016/0176247 A1 | 6/2016 | Cheikh et al. |
| 2017/0341323 A1 | 11/2017 | Destraves et al. |
| 2018/0174015 A1 | 6/2018 | Destraves |
| 2018/0264898 A1 | 9/2018 | Lallement et al. |
| 2019/0322142 A1 | 10/2019 | Lallement |
| 2019/0341673 A1 | 11/2019 | Destraves |
| 2020/0067171 A1 | 2/2020 | Destraves |
| 2020/0070598 A1 | 3/2020 | Noel |
| 2020/0079159 A1 | 3/2020 | Destraves |
| 2020/0247193 A1 | 8/2020 | Nakajima et al. |

FOREIGN PATENT DOCUMENTS

| | | |
|---|---|---|
| CN | 101279574 A | 10/2008 |
| CN | 101734112 A | 6/2010 |
| CN | 101801692 A | 8/2010 |
| CN | 103068598 A | 4/2013 |
| DE | 10 2007 043 077 A1 | 3/2009 |
| EP | 1310386 A2 | 5/2003 |
| EP | 1619052 A1 | 1/2006 |
| EP | 1 977 912 A1 | 10/2008 |
| EP | 2 524 818 A2 | 11/2012 |
| FR | 2936185 A1 | 3/2010 |
| JP | 2010-176454 A | 8/2010 |
| JP | 2011-195046 A | 10/2011 |
| JP | 2016-37236 A | 3/2016 |
| JP | 2016-49920 A | 4/2016 |
| WO | 2005/113262 A1 | 12/2005 |
| WO | 2012/030321 A1 | 3/2012 |
| WO | 2014/049058 A1 | 4/2014 |
| WO | 2016/193457 A1 | 12/2016 |

* cited by examiner

PNEUMATIC TIRE EQUIPPED WITH AN ELECTRONIC MEMBER

FIELD OF THE INVENTION

The present invention relates to a tyre casing equipped with an electronic unit communicating with radiofrequency devices external to the tyre casing.

TECHNOLOGICAL BACKGROUND

The development of electronic units integrated into mounted assemblies, comprising a tyre casing and a wheel, has intensified over the last few years. Specifically, these electronic units, such as for example radiofrequency transponders or RFID (acronym for radio-frequency identification) tags, contain information on the mounted assembly, such as the identifier of the tyre casing, its characteristic dimensions, etc. which are crucial data in the management and storage of such articles. In addition, these electronic units are also able to measure parameters of the mounted assembly such as, for example, the temperature inside the cavity formed by the tyre casing and the wheel rim in a mounted, inflated state. These parameters are essential to safe use of the mounted assembly. Communication with these electronic units, in particular in order to communicate the parameters of the mounted assembly, is generally achieved by way of radiofrequency transmission to external transmitter/receiver devices.

Integrating such electronic units into the mounted assembly and in particular into the tyre casing is not simple. Specifically, in order to ensure the reliability of the information contained in these electronic units and in particular the information regarding the identifier of the tyre casing throughout the cycle of the product, it is preferable for the electronic unit to be securely fastened to the tyre casing for which it contains identification information. Integrating such electronic units into the structure of a tyre casing poses a certain number of challenges. Firstly, inserting an electronic unit into the structure of the tyre may lead to degradation of the tyre casing; it is therefore necessary to ensure that the tyre casing keeps its physical integrity throughout its life cycle. The second relates to the radiocommunication performance of the electronic unit. Specifically, the complex structure of an assembly mounted with, in particular, its stacks of rubber blends of different permittivities and its metal elements generate interference in the radiofrequency operation of the antenna of the electronic unit, in particular in the UHF (acronym for ultra-high frequency) frequency band. Lastly, the third challenge consists in ensuring the physical integrity of the electronic unit itself throughout the life cycle of the tyre casing, and in particular because of the high thermomechanical stresses to which the tyre casing is subjected under running conditions.

Document EP1977912 A1 describes a preferred position of an electronic unit communicating through radiofrequency within a tyre casing architecture in order to improve the performance compromise between the radiocommunication quality of the electronic unit and the physical integrity both of the tyre casing and of the electronic unit. However, due to the constraints linked to the structural integrity of the electronic unit subjected to the thermomechanical stresses generated by the running of the tyre casing, the identified position, although it corresponds to the best compromise, is not optimum in terms of radiocommunication.

The aim of the invention is to identify the optimum positions for integrating, into the tyre casing, an electronic unit, such as a radiofrequency transponder, with regard to its physical integrity without impacting its radiocommunication performance, in particular in the UHF band, or the endurance of the tyre casing. Of course, it should not be necessary either to have to modify the main steps of manufacturing the tyre casing or its architecture.

DESCRIPTION OF THE INVENTION

The invention relates to a tyre casing equipped with an electronic unit and including a crown, two sidewalls and two beads revolving around a reference axis. This tyre casing also includes first threads forming outward segments and return segments that are arranged adjacently, aligned circumferentially, anchored in the two beads. In each bead, loops in each case link an outward segment to a return segment. In each bead, means for anchoring the first threads, comprising second threads oriented circumferentially axially bordering the first threads, form a spiral. Said first threads form a circumferential alignment defining the carcass ply separating the tyre casing into two zones, inside and outside with respect to the carcass ply. The electronic unit comprising at least one electronic chip and a radiating radiocommunication antenna is positioned radially externally in relation to the spiral. The tyre casing is characterized in that the electronic unit comprises a primary antenna electrically connected to the electronic chip, in that the primary antenna is electromagnetically coupled to the radiating antenna, and in that the radiating antenna is formed by a single-strand helical spring defining a first longitudinal axis.

Integrating such an electronic unit thus makes it possible both to reduce the risks of deterioration of the electronic unit due to its structure, while at the same time improving the radiocommunication performance of the electronic unit and minimizing the risks linked to the physical integrity of the tyre casing.

Specifically, deterioration of the electronic unit is generally caused by failures in the connections that exist between the communication antenna and the electronic portion of the unit. Here, no mechanical connection is produced since the transfer of energy between the communication antenna and the electronic chip is achieved with an electromagnetic field, via a primary antenna. However, although the size of the radiating antenna, which is linked to the communication frequency band and to its far-field operation, is by nature large, the primary antenna is not subjected to this constraint. It is thus of smaller size, in general allowing the deformations of the tyre casing to be easily endured without generating excessively high mechanical stresses within the electrical junction between it and the electronic chip. Lastly, incorporating the electronic unit into various components of the tyre casing protects the electronic unit from stresses external to the mounted assembly during running or during the mounting of the tyre casing on the wheel so as to form the mounted assembly.

Secondly, the introduction of the primary antenna makes it possible to disassociate contradictory functions between the size of the radiating antenna and the electrical impedance of the electronic portion of the unit. It is thus possible to dimension the primary antenna so as to match its electrical impedance to the chip in order to minimize losses and to therefore improve the energy efficiency of the electronic unit. The dimensions of the radiating antenna are then chosen solely with respect to the criterion of the communication frequency of the electronic unit. All of this tends to improve the radiocommunication performance of the electronic unit.

In addition, the position of the electronic unit in a tyre casing, far from the wheel of the mounted assembly and the metal spiral serving as means for anchoring the carcass ply, minimizes radiofrequency communication interference of the electronic unit.

In particular, the communication frequency of the electronic unit is situated in the ultra-high frequency (UHF) band of between 300 MHz and 3 GHz, allowing an advantageous compromise to be obtained between a small size of the radiating antenna, which is easily able to be integrated into a tyre casing, and a large distance from which the electronic unit is readable, this distance being far from the tyre casing. Advantageously, the electronic unit communicates in the narrow frequency band of between 860 MHz and 960 MHz and more specifically in very narrow bands of 860 MHz to 870 MHz and 915 MHz to 925 MHz. Specifically, at these frequencies, the conventional elastomer blends of the tyre casing constitute a good compromise with respect to propagation of radio waves. In addition, these frequencies are the highest possible in order to minimize the size of the radiating antenna so as to facilitate integration of the electronic unit into the tyre casing.

According to one preferred embodiment, the primary antenna is a coil having at least one turn defining a second longitudinal axis that is circumscribed in a cylinder. The axis of revolution of the cylinder is parallel to the second longitudinal axis and the diameter is between a third and three times, preferably between half and two times, the mean diameter of the helical spring of the radiating antenna.

Thus, with the primary antenna being a loop antenna, energy is mainly transferred between the radiating antenna and the primary antenna by inductive coupling. This then requires a certain proximity (in order to limit the air gap between the two antennas) between the two antennas, requiring the coil of the primary antenna to be dimensioned, with respect to the radiating antenna, in order to ensure a sufficient energy transfer efficiency by minimizing the air gap between the two coils in order to obtain the desired radiocommunication quality.

In concrete terms, the primary antenna may advantageously have a diameter smaller than that of the radiating antenna; in this case the entirety of the electronic portion of the transponder is inserted into the radiating antenna and the assembly is particularly robust in an environment such as that of a tyre.

The antenna may also have a diameter larger than that of the radiating antenna; this case is particularly advantageous when it is desired to add, to the radiofrequency transponder, other, active or passive, electronic components in order to perform additional functions, for example monitoring of the state of the tyre.

According to one preferred embodiment, with the radiating antenna having a central zone between two lateral zones and the primary antenna having a median plane perpendicular to the second longitudinal axis, the first and second longitudinal axes are parallel to one another and the median plane of the primary antenna is arranged in the central zone of the radiating antenna.

The term "central zone" is here understood to mean the cylinder defined by the inside diameter of the helical spring situated on either side of the median plane of the helical spring and the height of which corresponds to 25% of the length of the helical spring, preferably 15% of the length of the helical spring.

It is thus ensured that the distance between the radiating and primary antennas is constant along the longitudinal axes of these antennas, thus optimizing, at each element having a length of the primary antenna, an equivalent transfer of energy. In addition, with the magnetic field created by a coil through which an electric current flows being at a maximum in the central zone of the coil, it is preferable to position the median plane of the primary antenna in this central zone of the radiating antenna in order to maximize the magnetic field at the origin of the electromagnetic coupling.

According to one particular embodiment, the first longitudinal axis of the electronic unit is oriented perpendicular in relation to the first threads of the at least one circumferential alignment.

Better integrity of the electronic unit and in particular of the radiating antenna is thus ensured. Said radiating antenna may bear on the first threads of the circumferential alignment, which represents the equivalent of a reinforcing ply essential to the structural strength of the architecture of the tyre casing. In addition, the shape of the radiating antenna positioned in this way makes it possible to withstand the thermomechanical stresses of the tyre casing during running, in particular at the time of passing into the contact area. In particular, the radiating antenna deforms elastically due to its helical spring shape at the time of the deradialization of the cords of the carcass ply when passing through the contact area. In addition, when the first threads of the circumferential alignment are metal in nature, these are liable to generate interference with respect to the propagation of radio waves. The position of the radiating antenna perpendicular to the cords limits this interference.

According to one particular embodiment, with the tyre casing comprising at least one first annular rubber mass, coaxial with the reference axis, situated radially between the reference axis and the electronic unit, with at least one edge situated in the zone of the tyre casing in which the electronic unit is located, the electronic unit is spaced from the at least one radially outer edge of the first rubber mass by at least 5 mm, preferably by at least 10 mm.

If the elastic modulus of the first rubber mass is rigid with respect to another rubber mass of the architecture of the tyre casing that is adjacent thereto, the end of this first rubber mass then constitutes a structural singularity of the tyre casing. For example, this first rubber mass is a filler rubber situated adjacent to the second threads of the spiral or between the loops of the first threads of the circumferential alignment. Any structural singularity is a source of mechanical stress concentration that is favourable to possible cracking due to fatigue that is detrimental to the integrity of the structure. It is thus preferable to space the electronic unit, which is also a structural singularity in the architecture of the tyre casing, in order to limit the excessively high levels of mechanical stress at these singularities and preserve the structural integrity of the tyre casing. Depending on the rigidity of the rubber masses close to this free edge and to the electronic unit, it is necessary to define the correct spacing between the two singularities.

According to one particular embodiment, with the tyre casing comprising third reinforcing threads arranged adjacently and extending radially between a radially inner edge and a radially outer edge that are situated in the zone of the tyre casing at which the electronic unit is located, so as to form a circumferential alignment, and that are situated radially between the reference axis and the electronic unit, the electronic unit is spaced from a radially outer edge of the third reinforcing threads by at least 10 mm, preferably by at least 15 mm.

The radially outer free edge of the third reinforcing threads thus represents a mechanical singularity particularly susceptible to stress concentrations. Spacing the electronic unit, which also represents a mechanical singularity due to its rigidity, limits the stress concentrations in this zone. The mechanical endurance of the tyre casing is thus thereby improved. This is particularly true depending on the nature of the third reinforcing threads and their orientation with respect to the free edge of the circumferential alignment, thereby making it necessary to adjust the spacing between the two singularities.

According to one particular embodiment, the tyre casing comprises a second annular rubber mass, coaxial with the reference axis, situated radially externally to the electronic unit with respect to the reference axis, with a free edge in the zone in which the electronic unit is located, the electronic unit is spaced from the radially inner free edge of the second rubber mass by at least 5 mm, preferably by at least 10 mm.

If the elastic modulus of the second rubber mass is rigid with respect to another rubber mass of the architecture of the tyre that is adjacent or close thereto, the end of this first rubber mass then constitutes a structural singularity of the tyre casing. Any structural singularity is a source of mechanical stress concentration that is favourable to possible cracking due to fatigue that is highly detrimental to the integrity of the structure. It is thus preferable to space the electronic unit, which is also a structural singularity for the architecture of the tyre casing, in order to limit the excessively high levels of mechanical stress in this zone and preserve the structural integrity of the tyre casing.

According to one particular embodiment, the tyre casing comprises fourth reinforcing threads that are arranged adjacently, situated radially externally to the electronic unit with respect to the reference axis, and having a free edge situated in the zone in which the electronic unit is located. The electronic unit is spaced from the radially inner free edge of the fourth reinforcing threads by at least 10 mm, preferably by at least 15 mm.

The radially inner free edge of the fourth reinforcing threads thus represents a mechanical singularity particularly susceptible to stress concentrations. Spacing the electronic unit, which also represents a mechanical singularity due to its rigidity, limits the high stress concentrations in this zone. The mechanical endurance of the tyre casing is thus thereby improved. This is particularly true depending on the nature of the reinforcing threads and their orientation with respect to the free edge, thereby making it necessary to adjust the spacing between the two singularities.

According to one particular embodiment, the tyre casing comprises fifth metal reinforcing threads that are arranged adjacently, whose main direction is not parallel to the reference axis, and that are situated at least partly in the crown, delineated by two free edges. The electronic unit is situated axially between the two free edges of the fifth reinforcing threads. The electronic unit is radially spaced from the fifth reinforcing threads by at least 5 mm.

The fifth metal reinforcing threads situated in the crown are thus liable to interfere with the radiocommunication of the electronic unit also situated in the crown, in particular if the metal threads are not oriented perpendicular to the axis of the primary antenna of the electronic unit. The spacing of the electronic unit from the metal zones minimizes the radiocommunication interference of the electronic unit. This spacing is proportional to the active electromagnetic field zone of the primary antenna.

According to one preferred embodiment, the electronic unit is encapsulated in at least one electrically insulating encapsulating rubber mass.

Manipulation of the electronic unit during the step of manufacturing the tyre casing is thus facilitated, in particular so as to ensure precise and certain positioning of the electronic unit within the tyre casing. Specifically, the electronic unit comprises electronic components and radiocommunication components made primarily of metal or plastic, for which adhesion to a rubber mass is not natural. Using an encapsulating mass that is able to be applied outside of the manufacturing chain of the tyre casing makes it possible to create a rubber/rubber interface the adhesion of which is often facilitated. Lastly, the term electrically insulating is understood to mean that the electrical conductivity of encapsulating rubber is below the conductive charge transfer threshold of the blend.

According to one preferred embodiment, the elastic modulus of the encapsulating rubber mass is lower than or equal to the elastic modulus of the adjacent rubber blends.

The term "elastic modulus" is understood here to mean the modulus obtained when applying a uniaxial extension stress of 10% after an accommodation cycle and at a temperature of 22° C.

The rigidity of the encapsulating mass is thus lower than or equal to the rigidity of the adjacent rubber blends. Due to this, this encapsulating rubber will deform under mechanical stress, without transmitting excessively high forces to the electronic unit. This tends to improve the mechanical endurance of the electronic unit.

According to one highly preferred embodiment, the relative dielectric constant of the encapsulating rubber mass is lower than the relative dielectric constant of the adjacent rubber blends.

Generally speaking, the higher the dielectric constant of the rubber mass encapsulating the unit, the more attenuated the electrical signal received and transmitted by the electronic unit. For rubber blends of the tyre casing that are not electrically insulating, the relative dielectric constants may reach levels of 10 and even more in the UHF (acronym for ultra-high frequency) range. The radiocommunication performance of the electronic unit is greatly improved if the dielectric constant of the encapsulating mass is lower than the dielectric constants of the adjacent rubbers having high permittivity (>10). The relative dielectric constant of the encapsulating mass is preferably lower than 6.5 and very preferably lower than 4.5 in the UHF frequency range.

The term electrically insulating is understood here to mean that the electrical conductivity of the rubber is below the conductive charge transfer threshold of the blend.

Advantageously, the electronic unit is a radiofrequency transponder.

The electronic unit is thus interrogated passively from outside the electronic unit. The phases of interrogation of the electronic unit then do not require any power specifically from the electronic unit. The functionality of the radiofrequency transponder is primarily a role of identifying the tyre casing.

The electronic unit preferably also comprises one or more passive or active electronic components.

The electronic unit thus increases its functionalities by way of these additional components. The active components potentially supply the power necessary for the operation of the additional components. The power source may be for example a battery or a piezoelectric component. These components may also be an accelerometer or a temperature sensor.

BRIEF DESCRIPTION OF THE DRAWINGS

The invention will be better understood upon reading the following description, given solely by way of nonlimiting example and with reference to the appended figures, throughout which the same reference numerals denote identical parts, and in which.

DETAILED DESCRIPTION OF EMBODIMENTS

Figure 1:
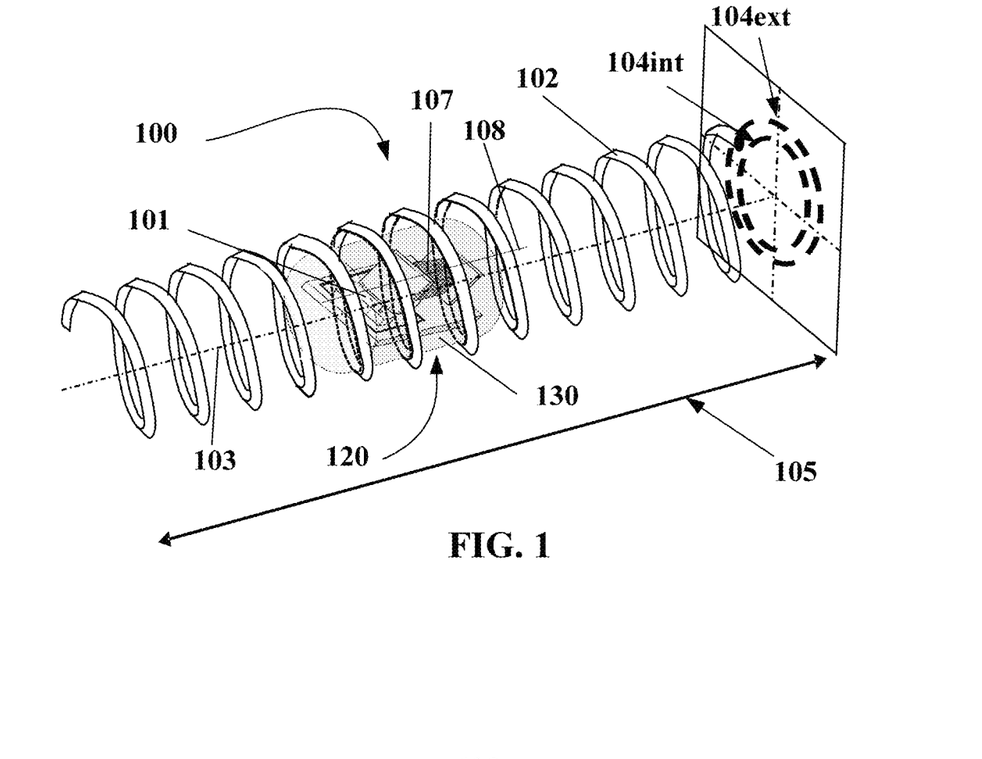
FIGS. 1 and 2 are perspective views of a radiofrequency transponder according to one of the subjects of the invention.

FIG. 1 shows a radiofrequency transponder 100 in a configuration in which the electronic portion 120 comprising the electronic chip 101 and the primary antenna 107 is situated inside the radiating antenna 102. This configuration allows a space saving for the radiofrequency transponder 100, which is rather intended to be incorporated into the bead or the sidewall of a tyre casing. The geometric shape of the electronic portion 120 is circumscribed in a cylinder the diameter of which is smaller than or equal to the inside diameter 104int of the helical spring forming the radiating antenna 102. It is thus firstly ensured that the air gap between the two antennas is small. In addition, it is ensured that the electronic portion 120 is held with respect to the radiating antenna 102, making it possible to have the same energy transfer efficiency between the two antennas over the entire length of the primary antenna 107. Lastly, the threading of the electronic portion 120 into the radiating antenna 102 is facilitated thereby. The median plane of the primary antenna 107 is located in the central zone of the radiating antenna 102 so as to maximize the electromagnetic coupling between the two antennas.

The electronic portion 120 comprises, in this example, an electronic chip 101 and a primary antenna 107 that is electrically connected to the electronic chip 101 by way of a printed circuit board. The primary antenna 107 consists here of a surface-mount-device (SMD) microcoil having an axis of symmetry. The median plane of the primary antenna defined by a normal parallel to the axis of symmetry of the SMD coil and separating the coil into two equal portions is determined. The components on the printed circuit board are electrically connected using copper tracks terminated by copper pads. The components on the printed circuit board are electrically connected using the wire-bonding technique by gold wires having a diameter of 20 micrometres running between the component and the pads. The assembly consisting of the printed circuit board of the electronic chip 101 and of the primary antenna 107 is embedded, using glob top technology, in a rigid mass 130 made of electrically insulating high-temperature epoxy resin, forming the electronic portion of the radiofrequency transponder. Of course, other configurations may be implemented. For example, the electrically insulating rigid mass may encapsulate just the electronic chip and a portion of the primary antenna.

The radiating antenna 102 consists of a steel wire with an outside diameter of 200 micrometres that has been plastically deformed so as to form a helical spring with an outside diameter of the order of 1.4 millimetres, having an axis of revolution defining the first longitudinal axis 103. The helical spring is primarily defined by a winding diameter of the coated wire and by a helix pitch. Thus, given the diameter of the wire, the inside 104int and outside 104ext diameters of the helical spring are precisely determined. The length 105 of the spring, of between 35 and 55 mm, corresponds here to the winding of a straight wire of a length equal to half the wavelength of the transmission signal of the radiofrequency transponder in an elastomer blend mass at 915 MHz. It is thus possible to define the central zone of the helical spring corresponding to around 25% of the length of the spring, and preferably 15%. The central zone is centred on the median plane of the helical spring.

Figure 2:
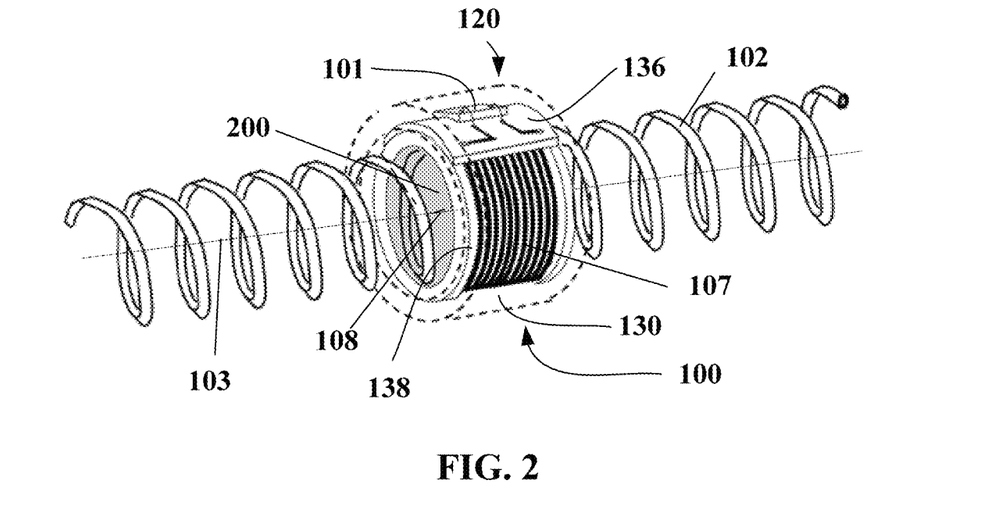

FIG. 2 shows a radiofrequency transponder 100 in a configuration in which the electronic portion 120 is located outside the radiating antenna 102. The geometric shape of the electronic portion has a cylindrical cavity 200 the diameter of which is larger than or equal to the outside diameter of the radiating antenna 102. The threading of the radiating antenna 102 into the cylindrical cavity 200 of the electronic portion is thus facilitated thereby. The median plane of the primary antenna 107 is located substantially in the central zone of the radiating antenna 102. This type of radiofrequency transponder will be of greater benefit in zones such as the crown of a tyre casing or the radially outer portion of the sidewall. Specifically, the electronic portion in this configuration may easily incorporate additional sensors, such as an accelerometer, a temperature sensor, or a battery, without otherwise impacting the transfer of energy between the two antennas. The constraint of such a solution is the volume occupied by the radiofrequency transponder 100, which is far bulkier than the first configuration.

In a first step of producing the electronic portion of the radiofrequency transponder 100, using the conventional ultrasound technique from the microelectronics industry, an electronic chip 101 and possibly additional components are connected to a flexible support 136 forming the printed circuit board ("Flex PCB") so as to form the electronic card. The electrical impedance of the electronic card is measured by way of an appropriate electrical apparatus, such as an impedance meter, across the terminals of the copper connections on the top face of the flexible printed circuit board where the primary antenna will be connected. Each of the copper connections has a central cavity passing through the thickness of the flexible support as far the bottom face of the support.

In a second step, the primary antenna 107 is produced around a tube made of electrically insulating resin whose inside diameter, delineating the cylindrical cavity 200 of the electronic portion, is larger than or equal to the outside diameter of the helical spring of the radiating antenna 102, that is to say of the order of 1.5 millimetres. The thickness of this tube is around 0.5 millimetres. Each end of the tube has an excess thickness of 0.5 millimetres, forming an edge 138 of a width of less than or equal to 0.5 millimetres.

A copper wire with a diameter of 200 micrometres is wound on the outer face of the tube, between the two edges, so as to form a given number of turns, thereby making it possible to produce a primary antenna 107 in the form of a cylindrical coil having an electrical impedance matched to the impedance of the electronic card to which it will be electrically connected.

The flexible printed circuit board 136 of the electronic card produced in the first step is fastened to the edges 138 of the tube made of insulating resin using H20E conductive adhesive from Tedella. Each of the ends of the copper wire of the primary antenna 107 was inserted beforehand between an edge 138 of the tube and the flexible printed circuit board 136, the two portions to be assembled.

Lastly, an electrical connection is produced by welding a copper metal conductor through the cavity passing through the flexible printed circuit board 136 at the copper connections. The electronic device consisting of the electronic chip 101 and of the primary antenna 107 is thus produced.

In the last step, the electronic device is coated with an electrically insulating rigid mass 130 over a thickness of at least 1 millimetre in order to protect the electronic card, containing the electronic chip 101, and the primary antenna 107 from various chemical attacks and to mechanically protect the electrical connections. An injection technique is used that consists in positioning the electronic device in a mould. However, to preserve the cylindrical cavity 200 of the initial tube made of resin, a flexible and air-impermeable membrane made of elastomer and passing through the cylindrical cavity 200 is installed, which is pressurized in order to hermetically seal this cylindrical cavity 200 against the propagation of the protective resin. The pressurized injection, at a pressure lower than that of the impermeable membrane, in the liquid state of a high-temperature epoxy resin, such as the Resolcoat 1060ES7 resin from Resoltech, is performed. This method allows a homogeneous diffusion of the resin over the entire electronic device, except for the cylindrical cavity 200. After opening the mould and stopping the pressurization of the flexible membrane, the electronic device, still having the cylindrical cavity 200, but this time coated externally with a rigid mass made of electrically insulating resin, is extracted. The assembly represents the electronic portion 120 of the radiofrequency transponder 100.

The radiating antenna 102 is then introduced into the cavity 200 of the electronic portion 120, such that the median plane of the electronic portion 120 corresponding to the median plane of the coil is situated in the central zone of the radiating antenna 102. The threading of the helical spring into the cavity 200 in fact ensures coaxiality of the first longitudinal axis 103 with respect to the second longitudinal axis 108. The assembly ensures an optimum transfer of energy between the two antennas.

Figure 3:
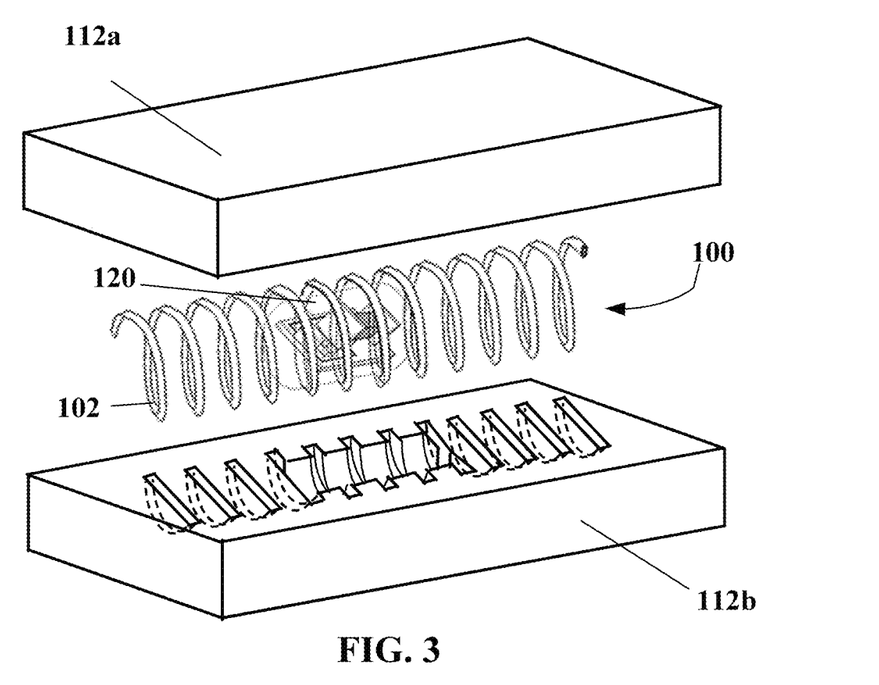
FIG. 3 is a perspective exploded view of a radiofrequency transponder encapsulated in an encapsulating rubber mass.

FIG. 3 shows a radiofrequency transponder 100 embedded in a flexible mass 112 made of electrically insulating elastomer, represented by the plates 112a and 112b of dimensions dependent on that of the radiating antenna 102, and a thickness of for example between 2 and 5 millimetres. This radiofrequency transponder 100 is intended for example to be introduced into the bead close to the bead wire filler rubber that is adjacent and radially external to the annular bead wire. The radiofrequency transponder 100 here is in a configuration in which the electronic portion 120 is situated inside the radiating antenna 102, thereby making it possible to miniaturize the radiofrequency transponder 100. The flexible mass 112 has an elastic modulus of the order of 3.2 MPa and a relative dielectric permittivity of less than 6.5.

Figure 4:
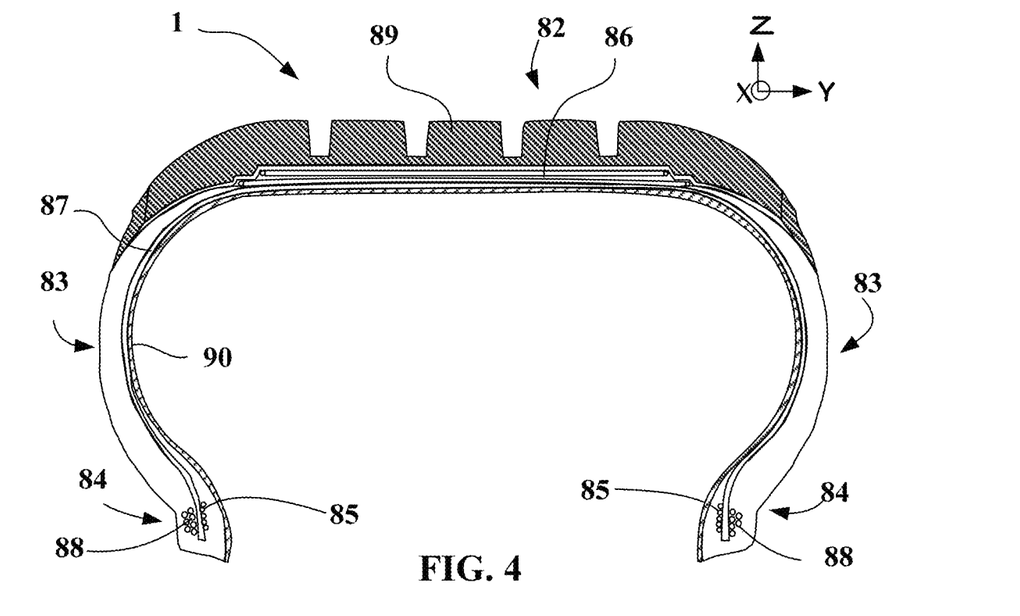
FIG. 4 is a view in meridian section of a portion of a tyre casing.

FIG. 4 shows a meridian section of a tyre casing 1 including a crown 82 reinforced by a crown reinforcement or belt 86, two sidewalls 83 and two beads 84. The crown reinforcement 86 is surmounted radially on the outside by a rubber tread 89. The crown reinforcement 86 consists of two superimposed reinforcing plies. The first ply is produced from metal reinforcing threads that are arranged adjacently and encapsulated in a calendering rubber mass. The reinforcing threads of the first ply have a main direction forming an angle of 25° in the anticlockwise direction with respect to the reference axis of the tyre casing 1. The second reinforcing ply also consists of a series of metal reinforcing threads arranged adjacently and encapsulated in a calendering rubber mass. By contrast, the main direction of these second reinforcing threads forms an angle of 25° with respect to the reference axis but in the clockwise direction. A carcass reinforcement 87, formed of first reinforcing threads arranged adjacently so as to form a circumferential alignment and of a calendering rubber protecting them, is anchored in the beads 84 separating the tyre casing into two zones, which will be called inner zone in the direction of the fluid cavity and outer zone towards the outside of the mounted assembly. This carcass reinforcement 87 is anchored at each bead 84 by way of spirals 85 that are situated internally with respect to the carcass reinforcement 87 and of spirals 88 that are situated externally. Each spiral is produced by winding reinforcing threads, here made of metal, around the reference axis. An airtight inner liner 90 extends from one bead to the other, radially internally in relation to the carcass reinforcement 87.

Figure 5:
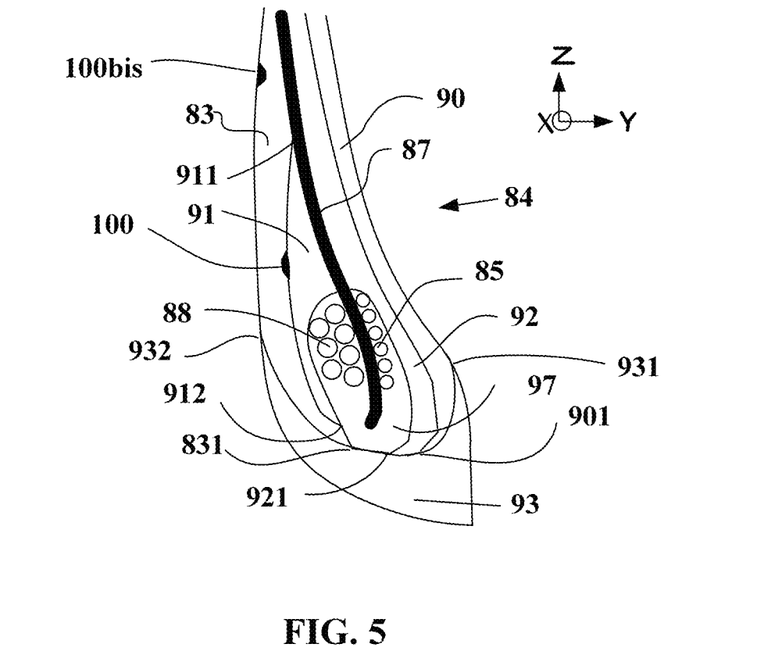
FIG. 5 is a view in meridian section of the bead of a tyre casing when the electronic unit is located in the outer zone of the tyre casing.

FIG. 5 shows a detailed view of the tyre casing 1 at the bead 84. This figure illustrates the position of the radiofrequency transponder 100 in the outer zone of the tyre casing 1 with respect to the carcass reinforcement 87.

The bead 84 is formed by the spiral 85 that is situated internally and the two spirals 88 that are situated externally and sandwiching the carcass reinforcement 87. These metal spirals are embedded in an encapsulating rubber mass 97 with a very high modulus and with very high creep resistance, which thus anchors the reinforcing threads. A filler rubber mass 91 is situated axially and radially externally and adjacent to the anchoring rubber mass 97 and to the carcass reinforcement 87. It has a first radially outer free edge 911 bearing on a face of the carcass reinforcement 87. The radially inner free edge 912 of this filler mass itself bears on the encapsulating mass 97. Lastly, the sidewall 83 covers both the filler rubber 91 and the carcass reinforcement 87. The sidewall has a free edge 831 situated radially internally and ending on the rubber mass 97 in the radially inner portion.

The airtight inner liner 90 is located on the inner zone of the tyre casing 1. It ends with a free edge 901 adjacent to the protective bead 93. Between the airtight inner liner 90 and the carcass reinforcement 87 there is positioned a filler rubber mass 92 that has a radially inner free edge 921 bearing on the radially inner portion of the encapsulating mass 97. Lastly, a protective bead 93 protects the bead and in particular the radially inner ends 901, 921 and 831 of the airtight inner liner 90, of the filler rubber 92 and of the sidewall 83, respectively. The outer face of this protective bead 93 is able to be in direct contact with the rim flange when mounting the tyre casing on the wheel. This protective bead 93 has two radially outer free edges. The first free edge 931 is situated in the inner zone of the tyre casing 1. The second free edge 932 is situated in the outer zone of the tyre casing 1.

The bead 84 of this tyre casing is equipped with two radiofrequency transponders 100 and 100bis that are situated in the outer zone of the tyre casing 1. The first radiofrequency transponder 100, having been encapsulated beforehand in an electrically insulating encapsulating rubber, is positioned on the outer face of the filler 91. It is positioned at a distance of at least 10 millimetres from the free edge 932 of the protective bead, which constitutes a mechanical singularity. This position ensures a zone of mechanical stability for the radiofrequency transponder 100 that is beneficial to the mechanical endurance thereof. In addition, embedding it within the structure of the tyre casing 1 gives it good protection against mechanical attacks coming from outside the tyre.

The second radiofrequency transponder 100bis, having been encapsulated beforehand in an electrically insulating encapsulating rubber compatible with or similar to the material of the sidewall 83, is positioned on the outer face of the sidewall. The material similarity between the sidewall 83 and the encapsulating rubber ensures that the radiofrequency transponder 100bis is installed inside and at the periphery of the sidewall 83 during the curing process. The radiofrequency transponder 100bis is simply placed on the uncured outer face on the sidewall 83 during the production of the tyre casing 1. Pressurizing the green body in the curing mould ensures the positioning of the radiofrequency transponder 100bis in the cured state, as shown. This radiofrequency transponder 100bis is situated far from any free edge of a rubber component of the tyre casing. In particular, it is spaced from the free edge 932 of the protective bead, and from the free edge 911 of the filler rubber. Its position at the upper portion of the bead ensures improved communication performance with an external radiofrequency reader. Cyclic stresses during running will not be disruptive due to the mechanical decoupling between the radiating antenna and the electronic portion.

Figure 6:
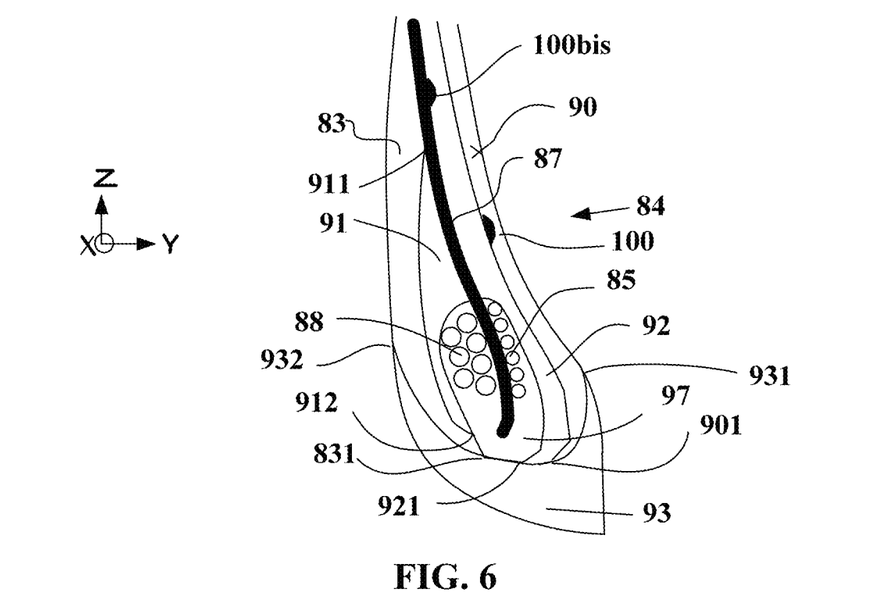
FIG. 6 is a view in meridian section of the bead of a tyre casing when the electronic unit is located in the inner zone of the tyre casing.

FIG. 6 shows a detailed view of a tyre casing 1 at the bead 84. This figure illustrates the position of the radiofrequency transponder 100 in the inner zone of the tyre casing 1 with respect to the carcass reinforcement 87.

The location of the radiofrequency transponder 100 at the interface between the airtight inner liner 90 and the filler rubber 92 allows the electronic unit to be mechanically stabilized. The radiofrequency transponder 100 is about 40 millimetres above the free edge 931 of the protective bead 93 that constitutes a mechanical singularity due to the high rigidity of the protective bead 93 in comparison with the airtight inner liner 90 and with the filler rubber 92. By contrast, in order to ensure suitable radiocommunication performance, it is essential to use an encapsulating rubber for the radiofrequency transponder 100 that is electrically insulating, and to place the first longitudinal axis of the radiating antenna perpendicular to the reinforcing threads of the carcass reinforcement 87. From a mechanical endurance point of view, this location is ideal for the electronic unit, which is protected from any external mechanical attack and from any internal thermomechanical attack.

The second location of the radiofrequency transponder 100bis according to the invention allows improved radiocommunication performance by being placed higher in the bead 84. However, it should be encapsulated in an electrically insulating rubber and the first longitudinal axis of the radiating antenna should be positioned perpendicular to the reinforcing threads of the carcass reinforcement 87. Here, in this example, the first longitudinal axis is placed circumferentially.

Figure 7:
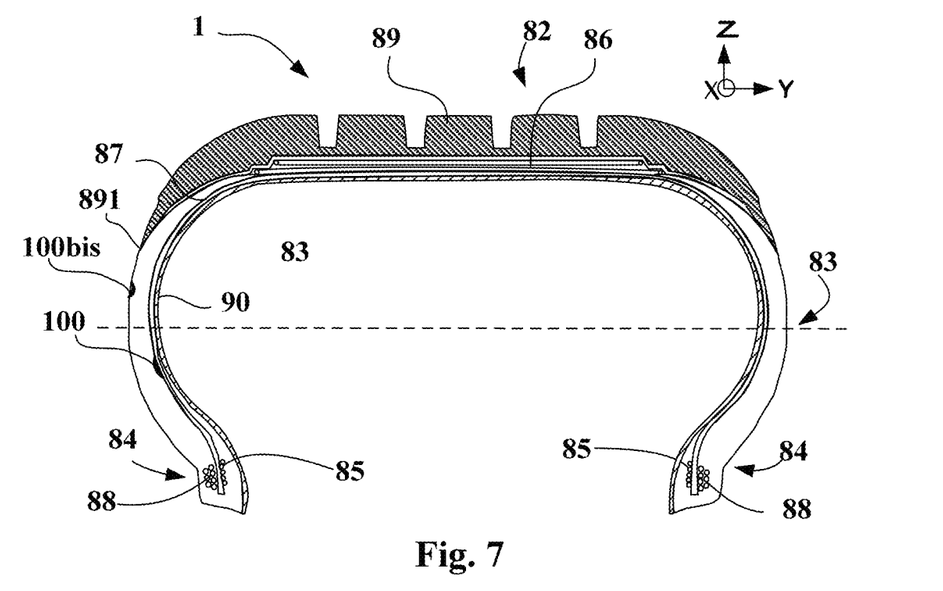
FIG. 7 is a view in meridian section of the portion of a tyre casing when the electronic unit is located on the sidewall of the tyre casing.

FIG. 7 shows a view in meridian section of a tyre casing 1 corresponding to the installation of the radiofrequency transponder 100 on the sidewall 83 of the tyre casing 1. In this example, the radiofrequency transponder 100 is installed substantially half way up the height of the sidewall 83 of the tyre casing 1, symbolized by the dashed line. This is an ideal zone in terms of radiocommunication, since it is first of all spaced from the large metal zones of the mounted assembly 1 while offering a free space on the outside of the mounted assembly. In addition, the surrounding rubbers are flexible rubbers generally subjected to little load, which is favourable to good radiofrequency operation of the radiofrequency transponder 100. With regard to the physical integrity of the electronic unit, even though this geometric zone is subjected to great cyclic stress in particular when passing into the contact area, the mechanical decoupling of the radiating antenna from the electronic portion allows a satisfactory lifetime of the radiofrequency transponder 100. With regard to the physical integrity of the tyre casing 1, the radiofrequency transponder 100 should be sufficiently spaced from the free edges of the filling rubbers, which are in this case located in the outer zone of the tyre casing 1. By bearing on the carcass reinforcement 87, it is necessary, after having encapsulated it in an electrically insulating encapsulating mass if required, to place the first longitudinal axis of the electronic unit perpendicular to the reinforcing threads of the carcass reinforcement 87, which amounts to placing it circumferentially in the case of a tyre casing 1 with a radial structure. Placing the electronic unit in the central zone of the sidewall, which is the zone that is most mechanically stressed during running, is however preferably avoided.

The second position on the sidewall 83 amounts to positioning the radiofrequency transponder 100bis on the outer face of the sidewall by encapsulating it in a rubber similar to that of the sidewall 83. The advantage of this position is the material homogeneity around the electronic unit, which improves the radiocommunication performance of the radiating antenna. In order to meet the constraints linked to the integrity of the tyre casing 1, the radiofrequency transponder 100bis should be spaced from any free reinforcing ply edge or rubber mass situated in the outer zone of the tyre casing 1. Care will be taken in particular to space the radiofrequency transponder 100bis from the free edge 891 of the tread 89 by at least 5 millimetres. Of course, the physical integrity of the radiofrequency transponder 100bis will be all the more ensured the further the radial position thereof is from the equator, corresponding to the axial ends of the mounted assembly, which are zones susceptible to impacts with road equipment, such as pavement edges. Other positions, not illustrated in the drawings, are possible in particular on the inner zone of the tyre casing 1 with respect to the carcass reinforcement 87. The inner zone of the tyre casing constitutes a natural protective zone for the electronic unit which is beneficial to the physical integrity thereof, at the expense of slightly reduced radiocommunication performance. This inner zone also has the advantage of limiting the number of free edges of components of the tyre casing that are potentially weak points with respect to the mechanical endurance of the tyre casing equipped with an electronic unit.

Figure 8:
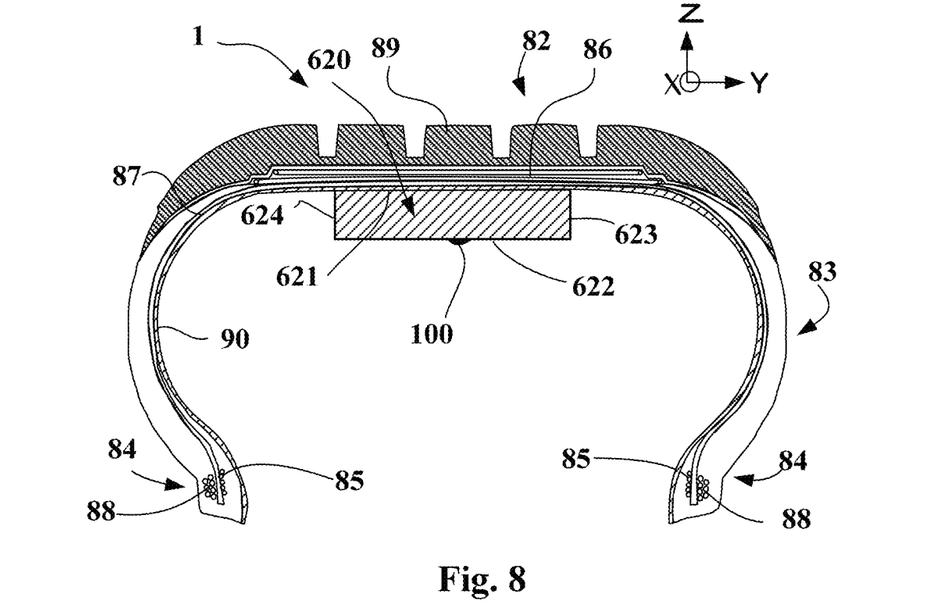
FIG. 8 is a view in meridian section of a portion of the tyre casing when the electronic unit is located at the crown of the tyre casing.

FIG. 8 shows a view in meridian section of a tyre casing 1 corresponding to the installation of the radiofrequency transponder 100 at the crown 82 of the tyre casing 1. The tyre casing 1 in this example comprises a crown reinforcement 86 formed by two metal reinforcing plies oriented at 25 degrees with respect to the reference axis, one in the clockwise direction and the other in the anticlockwise direction. The tyre casing 1 also comprises an elastomer foam component 620 intended to damp cavity resonant noise. This foam 620 takes the form of a ring of rectangular cross section about the reference axis of the tyre casing 1. The cross section of the ring comprises two faces 621 and 622 that are respectively situated radially externally and internally with respect to the reference axis. These two faces linked to one another by two axial edges 623 and 624 form a thickness of the order of 5 millimetres. This component 620 is fastened, by conventional adhesion means, on the radially lower face of the airtight inner liner 90 of the tyre casing in the cured state on the radially outer face 621. The radiofrequency transponder 100 is fastened on the radially lower face 622 by any type of chemical adhesion means, such as polyurethane, silicone, cyanoacrylate or silanized polyether adhesives. The radiofrequency transponder 100 is thus sufficiently radially spaced from the metal reinforcing plies so as not to be subjected to interference during radiofrequency operation thereof. In addition, it is also spaced from any free edge of a rubber component of the tyre casing 1. Lastly, damping the component 620 preserves any excessively high transfer of energy to the radiofrequency transponder 100. The benefit of this position is that of indiscriminately allowing communication of the radiofrequency transponder 100 via both sidewalls 83 of the tyre casing 1. This is convenient so as no longer to integrate the electronic unit on the outer or inner side of the mounted assembly, depending on the use. It is possible to orient the axis of the electronic unit axially or circumferentially.

Other positions of the radiofrequency transponder 100 at the crown 82 are possible, although not illustrated in the appended figures. For example, when the tread 89 is formed by two radially superimposed elastomer blends having different functions and material properties. Incorporating the radiofrequency transponder at the interface between these two blends firstly ensures sufficient spacing of the electronic unit with respect to the metal reinforcing plies 86 of the crown 82. Reading from outside the tread 89 is also facilitated. For considerations of the ability of the electronic unit to withstand heat, the position of the radiofrequency transponder to the right of a longitudinal channel would then be preferable for the lifetime of the component and the integrity of the tyre casing.

Another alternative would be to place the radiofrequency transponder 100 on the radially lower face of a self-sealing rubber blend layer situated on the airtight inner liner 90 to the right of the tread 89. This layer has good rubber/rubber adhesive properties and offers a sufficient radial thickness to ensure sufficient spacing between the electronic unit and the metal reinforcing plies.

The position of the radiofrequency transponder 100 on the inner or outer zone of the tyre casing 1 with respect to the carcass reinforcement 87 is thus possible even at the crown 82.

The invention claimed is:

1. A tire casing equipped with a radiofrequency transponder and including a crown, two sidewalls and two beads revolving around a reference axis, first threads forming outward segments and return segments that are arranged adjacently, aligned circumferentially, anchored in the two beads with, in each bead, loops in each case linking an outward segment to a return segment and, in each bead, means for anchoring the first threads, comprising second threads oriented circumferentially axially bordering the first threads and forming at least one spiral, the first threads forming at least one circumferential alignment defining a carcass ply that separates the tire casing into two zones, inside and outside, with respect to the carcass ply, and the radiofrequency transponder comprising at least one electronic chip and a radiating radiocommunication antenna and being positioned radially externally in relation to the at least one spiral,
  wherein the radiofrequency transponder comprises a primary antenna electrically connected to the electronic chip,
  wherein the primary antenna is electromagnetically coupled to the radiating antenna,
  wherein the radiating antenna is formed by a single-strand helical spring defining a first longitudinal axis, and
  wherein the primary antenna is a coil having at least one turn defining a second longitudinal axis that is circumscribed in a cylinder, an axis of revolution of which is parallel to the second longitudinal axis and a diameter of which is between a third and three times a mean diameter of the helical spring of the radiating antenna.

2. The tire casing according to claim 1, wherein, with the radiating antenna having a central zone between two lateral zones and the primary antenna having a median plane perpendicular to the second longitudinal axis, the first and second longitudinal axes are parallel to one another and the median plane of the primary antenna is arranged in the central zone of the radiating antenna.

3. The tire casing according to claim 1, wherein the first longitudinal axis of the radiofrequency transponder is oriented perpendicular in relation to the first threads of the at least one circumferential alignment.

4. The tire casing according to claim 1, wherein, with the tire casing comprising at least one first annular rubber mass, coaxial with the reference axis, situated radially between the reference axis and the radiofrequency transponder, with at least one edge situated in the zone of the tire casing in which the radiofrequency transponder is located, the radiofrequency transponder is spaced from the at least one radially outer edge of the at least one first annular rubber mass by at least 5 mm.

5. The tire casing according to claim 1, wherein, with the tire casing comprising third reinforcing threads arranged adjacently and extending radially between a radially inner edge and a radially outer edge that are situated in the zone of the tire casing at which the electronic unit is located, and that are situated radially between the reference axis and the radiofrequency transponder, the radiofrequency transponder is spaced from a radially outer edge of the third reinforcing threads by at least 10 mm.

6. The tire casing according to claim 1, wherein, with the tire casing comprising at least one second annular rubber mass, coaxial with the reference axis, situated radially externally to the radiofrequency transponder with respect to the reference axis, with at least one edge situated in the zone of the tire casing in which the radiofrequency transponder is located, the radiofrequency transponder is spaced from the at least one radially inner edge of the at least one second annular rubber mass by at least 5 mm.

7. The tire casing according to claim 1, wherein, with the tire casing comprising at least fourth reinforcing threads arranged adjacently, situated radially externally to the radiofrequency transponder with respect to the reference axis, and having at least one free edge situated in the zone of the tire casing in which the radiofrequency transponder is located, the radiofrequency transponder is spaced from a radially inner free edge of the at least fourth reinforcing threads by at least 10 mm.

8. The tire casing according to claim 1, wherein, with the tire casing comprising at least fifth metal reinforcing threads that are arranged adjacently, whose main direction is not parallel to the reference axis, situated at least partly in the crown, delineated by two free edges, the radiofrequency transponder, situated axially between the two free edges, is radially spaced from the at least fifth reinforcing threads by at least 5 mm.

9. The tire casing according to claim 1, wherein the radiofrequency transponder is encapsulated in at least one electrically insulating encapsulating rubber mass.

10. The tire casing according to claim 9, wherein an elastic modulus of the encapsulating rubber mass is lower than or equal to an elastic modulus of adjacent rubber blends.

11. The tire casing according to claim 9, wherein a relative dielectric constant of the encapsulating rubber mass is lower than a relative dielectric constant of adjacent rubber blends.

12. The tire casing according to claim 1, wherein the radiofrequency transponder additionally comprises one or more passive or active electronic components.

\* \* \* \* \*